(12) United States Patent
Saka et al.

(10) Patent No.: US 11,132,218 B2
(45) Date of Patent: Sep. 28, 2021

(54) TASK EXECUTION WITH NON-BLOCKING CALLS

(71) Applicant: PayPal, Inc., San Jose, CA (US)

(72) Inventors: Prasad Saka, Bangalore (IN); Jian Wan, Cupertino, CA (US); Rama Prasad Bodepu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 130 days.

(21) Appl. No.: 16/235,994

(22) Filed: Dec. 28, 2018

(65) Prior Publication Data
US 2020/0210223 A1 Jul. 2, 2020

(51) Int. Cl.
| | |
|---|---|
| *G06F 9/46* | (2006.01) |
| *G06F 9/48* | (2006.01) |
| *G06F 9/30* | (2018.01) |
| *G06F 16/901* | (2019.01) |
| *G06F 9/50* | (2006.01) |
| *G06F 9/54* | (2006.01) |

(52) U.S. Cl.
CPC .......... *G06F 9/463* (2013.01); *G06F 9/30123* (2013.01); *G06F 9/4881* (2013.01); *G06F 9/5038* (2013.01); *G06F 9/546* (2013.01); *G06F 16/9024* (2019.01); *G06F 2209/5011* (2013.01)

(58) Field of Classification Search
CPC .... G06F 9/463; G06F 9/30123; G06F 9/4881; G06F 9/546; G06F 16/9024; G06F 2209/5011
See application file for complete search history.

(56) References Cited

U.S. PATENT DOCUMENTS

| | | | |
|---|---|---|---|
| 6,058,389 A | 5/2000 | Chandra et al. | |
| 6,839,748 B1 * | 1/2005 | Allavarpu | H04L 41/0213 709/223 |
| 9,450,849 B1 * | 9/2016 | Goldberg | H04L 43/04 |
| 10,491,664 B2 * | 11/2019 | Tan | G06F 9/54 |

(Continued)

OTHER PUBLICATIONS

Karthik Ramachandra et al., "Database-Aware Program Optimizations via Static Analysis", [Online], pp. 60-69, [Retrieved from Interneton Jun. 21, 2020], <http://sites.computer.org/debull/A14mar/p60.pdf> (Year: 2014).*

(Continued)

*Primary Examiner* — Ziaul A Chowdhury
(74) *Attorney, Agent, or Firm* — Kowert, Hood, Munyon, Rankin & Goetzel, P.C.

(57) ABSTRACT

Techniques are disclosed relating to task execution with non-blocking calls. A computer system may receive a request to perform an operation comprising a plurality of tasks, each of which corresponds to a node in a graph. A particular one of the plurality of tasks specifies a call to a downstream service. The computer system may maintain a plurality of task queues, each of which is associated with a thread pool. The computer system may enqueue, in an order specified by the graph, the plurality of tasks in one or more of the plurality of task queues. The computer system may process the plurality of tasks. Such processing may include a thread of a particular queue in which the particular task is enqueued performing a non-blocking call to the downstream service. After processing the plurality of tasks, the computer system may return a result of performing the operation.

15 Claims, 8 Drawing Sheets

(56) References Cited

U.S. PATENT DOCUMENTS

| | | | |
|---|---|---|---|
| 2002/0004835 A1 | 1/2002 | Yarbrough | |
| 2004/0199571 A1* | 10/2004 | Spiegl | H04L 41/5012 709/201 |
| 2005/0097555 A1* | 5/2005 | Tuel | G06F 9/466 718/101 |
| 2006/0136930 A1* | 6/2006 | Kaier | G06F 9/4843 718/105 |
| 2006/0161449 A1* | 7/2006 | McKinney | G06F 16/273 705/313 |
| 2007/0256083 A1* | 11/2007 | Vayssiere | G06F 11/30 719/320 |
| 2009/0006520 A1* | 1/2009 | Abib | G06F 9/4881 709/201 |
| 2009/0183167 A1* | 7/2009 | Kupferschmidt | G06F 9/5027 718/104 |
| 2012/0151462 A1* | 6/2012 | Joisha | G06F 8/45 717/157 |
| 2012/0215840 A1* | 8/2012 | Chen | G06F 9/466 709/203 |
| 2014/0245309 A1* | 8/2014 | Otenko | G06F 9/546 718/102 |
| 2016/0105532 A1* | 4/2016 | Tan | G06F 16/95 709/203 |
| 2019/0213054 A1* | 7/2019 | Mageswaran | G06F 11/1076 |
| 2019/0286489 A1* | 9/2019 | Gong | G06K 9/6224 |

OTHER PUBLICATIONS

Karthik Ramachandra et al., "Program Transformations for Asynchronous and Batched Query Submission", [Online], pp. 531-544, [Retrieved from Internet on Jun. 21, 2020], <https://ieeexplore.ieee.org/stamp/stamp.jsp?arnumber=6847234> (Year: 2015).*

Na Wu et al., "An Extensible Fault Tolerance Testing Framework for Microservice-based Cloud Applications", [Online], pp. 38-42 , [Retrieved from Interneton May 17, 2021], <https://dl.acm.org/doi/pdf/10.1145/3290420.3290476>, (Year: 2018).*

Daniel Casini et al., "Analyzing Parallel Real-Time Tasks Implemented with Thread Pools", [Online], pp. 1-6, [Retrieved from Interneton May 18, 2021], <https://dl.acm.org/doi/pdf/10.1145/3316781.3317771> (Year: 2019).*

Jinesh Varia, "Architecting for the Cloud: Best Practices", [Online], pp. 1-23, [Retrieved from Interneton May 18, 2021], <https://www.ganth.net/docs/AWS/AWS_Cloud_Architecture_Best_Practices.pdf> (Year: 2011).*

Marlon E. Pierce et al., "Apache Airavata: Design and Directions of a Science Gateway Framework", [Online], pp. 48-54, [Retrieved from Interneton May 18, 2021], <https://ieeexplore.ieee.org/stamp/stamp.jsp?tp=&arnumber=6882068> (Year: 2014).*

* cited by examiner

TASK EXECUTION WITH NON-BLOCKING CALLS

BACKGROUND

Technical Field

This disclosure relates generally to a service that performs non-blocking calls.

Description of the Related Art

Generally speaking, computer systems that implement a service receive requests from other computer systems to perform certain operations, often on behalf of users. As an example, a computer system may implement a video streaming service that receives requests from a user device to stream video content to the user device so that a user can view it. Depending on the popularity of the service, in some instances, a computer system may receive upwards of half a billion requests per day that need to be processed. Beyond purely processing the requests, if such processing is not performed quickly enough, users might become dissatisfied with that service.

Figure 1:
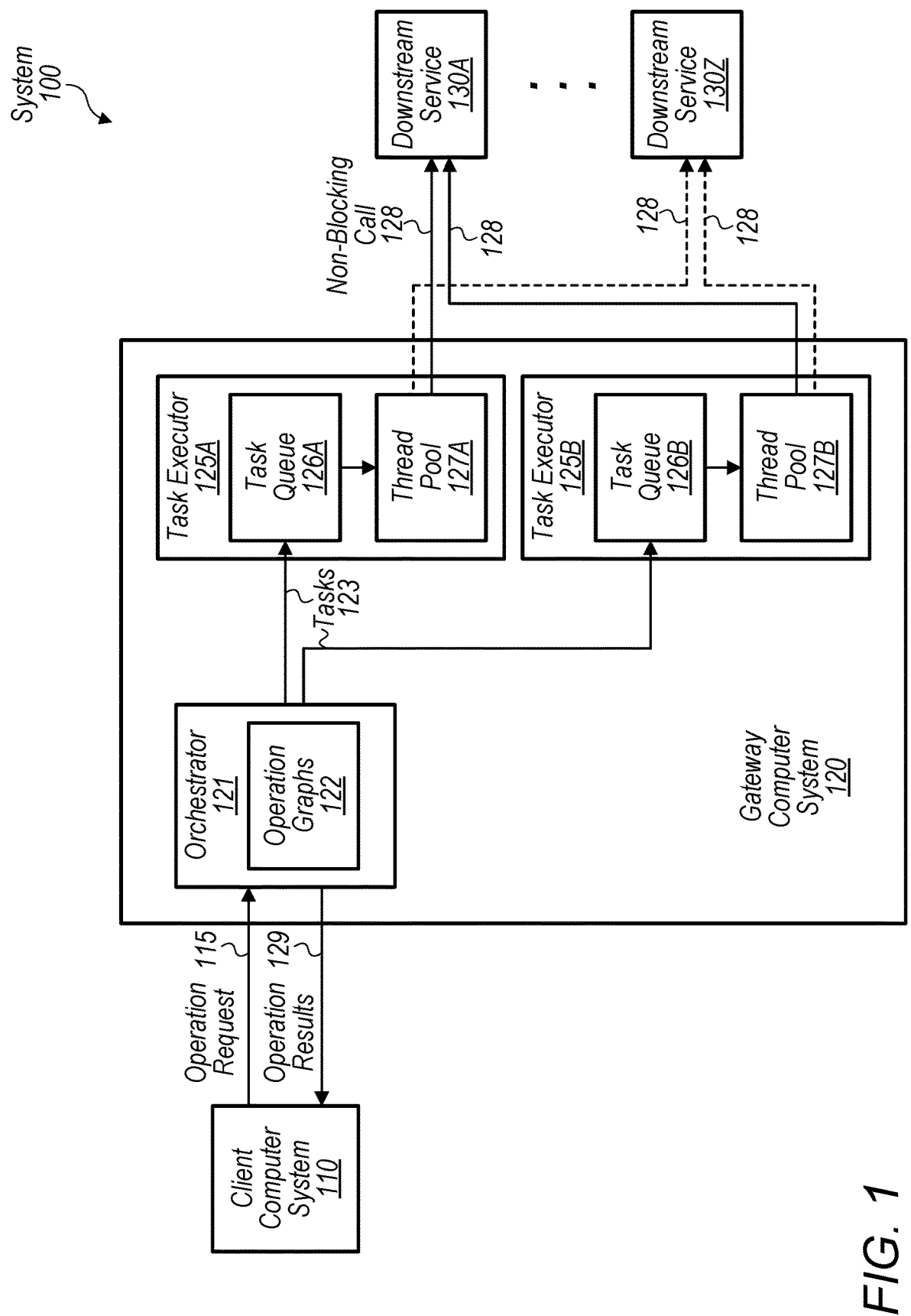
FIG. 1 is a block diagram illustrating example elements of a system that facilitates the processing of requested operations, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a thread pool that has multiple threads, the terms "first" thread and "second" thread can be used to refer to any thread of the thread pool. In other words, the first and second threads are not limited to the initial two threads of the thread pool.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A "service" is a set of software functionality that is performed by one or more computer systems in response to a request for that service. One possible example of a service is an authentication service. In one implementation of such a service, a user provides account credentials as part of a request to the service. The service, in turn, performs an "operation" that returns an indication whether the user is authenticated. This operation may be implemented by a plurality of sub-components referred to as "tasks." Note that, in some instances, a task within a service may itself include calls to other services. This relationship may be described as a "gateway service" including a call to a "downstream service." A downstream service may itself make calls to other downstream services.

The manner in which a service is implemented may determine how well it performs under a high volume of requests. As one possible means of processing all the requests that are received by a service, a computer system may instantiate, for each request, a set of threads to handle the request. The threads in the set might each be assigned to a particular task that needs to be performed as part of carrying out that request. In some instances, a thread may need to invoke another service to perform some portion of its assigned task. Accordingly, such a thread invokes the other service and then remains idle while it waits for some response from the service. Even while that thread remains idle, it still occupies a significant amount of a system's resources (e.g., memory). This problem may be further exacerbated by the fact that a computer system may be processing thousands of requests at any given moment; thus, a scenario might arise in which thousands of threads are instantiated, with only a portion of them doing anything substantive. The present disclosure describes an architecture for implementing a service that allows for high performance and low latency, while also reducing thread contention and memory footprint issues.

More particularly, the present disclosure describes techniques for implementing an architecture that uses a non-blocking application programming interface (non-blocking API) for invoking computer systems (or services) to perform actions. In various embodiments that are described below, a computer system executes threads that can perform non-blocking calls to downstream services that assist in processing requests that are received by the computer system. As used herein, the term "non-blocking call" broadly refers to an operation in which a call is made to a computer system, but the caller does not wait for a response before continuing on to perform other work. For example, a thread may perform a non-blocking call by sending a request to a service and then, without waiting for a response, perform other work such as accessing information stored within a database. It is noted, however, that the caller need not perform other work, but rather have the ability to perform other work without having to wait for a response. In contrast to the non-blocking call, in a blocking call, the caller waits for a response before continuing on its execution path. For example, a thread may send a request to an application server for a web page. Until that thread receives a response (e.g., a web page), it idly waits—it is blocked from continuing down its execution path.

In various embodiments, a computer system maintains task queues for storing tasks and a thread pool for each task queue to process enqueued tasks. The computer system may receive a request to perform an operation comprising one or more tasks. In various embodiments, the computer system enqueues the one or more tasks in the maintained task queues. In some cases, the computer system may access a graph for the operation that includes nodes that correspond to the one or more tasks. Accordingly, the computer system may enqueue the one or more tasks in the order identified by the accessed graph. In various embodiments, at least one of the tasks includes calling a downstream service to perform an action. The thread that processes that task performs a non-blocking call to the downstream service. Accordingly, in some cases, the thread may retrieve another task from its task queue for processing without waiting for a response from the downstream service. After the one or more tasks have been processed, the computer system may provide a response to the request that includes a result from performing the operation.

These techniques may be advantageous over prior approaches as these techniques allow for requests to be processed in a more efficient manner. As an example, instead of instantiating thousands of threads, many of which may be idle while they wait for a response to be returned from a downstream service, a smaller set of threads may be instantiated that are able to process the same amount of tasks (or more) because the threads are able to perform non-blocking calls and thus do not have to be idle while waiting for a response from a downstream service. That is, instead of a thread remaining idle while it waits for a response (as done in prior approaches), the thread can perform other work such as retrieving and performing another task. Since these techniques may allow for one thread to perform the same amount of work as many threads in the prior approaches, a computer system may not instantiate as many threads. Thus, a computer system may have more available resources for allocation to other applications and services, for example. An example system for implementing these techniques will now be discussed below, starting with FIG. 1.

Turning now to FIG. 1, a block diagram of a system 100 is shown. System 100 is a set of components that are implemented via hardware or a combination of hardware and software routines. In the illustrated embodiment, system 100 includes a client computer system 110, a gateway computer system 120, and downstream services 130A-Z. Certain components may be a part of the same environment or domain. As an example, gateway computer system 120 and downstream service 130A may be operated by the same entity. As further illustrated, gateway computer system 120 includes: an orchestrator 121 that has operation graphs 122; and task executors 125A and 125B that have a respective task queue 126 and thread pool 127. In some embodiments, system 100 may be implemented differently than shown. For example, computer system 120 may include any number of task executors 125.

Client computer system 110, in various embodiments, is a system that issues operation requests 115 to gateway computer system 120 to perform particular operations. For example, client computer system 110 may be a group of server systems implementing a web service that is accessible to other systems and their users. Accordingly, operation requests 115 may be sent by that group of server systems to gateway computer system 120 as part of implementing the web service. For example, when a user logs into the web service or purchases a good or service, an operation request 115 may be issued to gateway computer system 120 in order to determine a risk associated with the transaction that the user wants to perform.

In various embodiments, client computer system 110 maintains information identifying the operations supported by gateway computer system 120 and the corresponding API calls to invoke those operations. Accordingly, when instructed to perform a particular operation, client computer system 110 may transmit an operation request 115 to gateway computer system 120 for that particular operation by performing the API call that corresponds to that particular operation. In various cases, operation request 115 may identify a callback function that enables gateway computer system 120 to return operation results 129 for that particular operation. As explained below, performing a given operation may involve communicating with downstream services 130; however, instead of communicating directly with those downstream services 130, in various embodiments, client computer system 110 uses gateway computer system 120 as a gateway to those downstream services.

Gateway computer system 120, in various embodiments, facilitates the performance of requested operations, which may include invoking certain downstream services 130. In order to perform an operation, gateway computer system 120 may determine what tasks 123 need to be performed to carry out the operation. For example, client computer system 110 may request that gateway computer system 120 generate and return a report having a set of datasets that are arranged in a certain format. Accordingly, gateway computer system 120 may determine a set of tasks 123 to be performed for that operation, which may include, for example, a task 123 that involves retrieving a dataset from a local database, a task 123 that involves retrieving a dataset from downstream service 130Z, and/or a task 123 that involves formatting the datasets. For tasks 123 that do not involve a downstream service 130, gateway computer system 120 may perform those tasks itself. As an example, gateway computer system 120 may locally perform the task 123 that involves formatting the datasets (in the earlier example). For tasks 123 that do involve a downstream service 130, in various embodiments, gateway computer system 120 invokes the downstream service 130 by performing a non-blocking call 128 to that service. By performing non-blocking call 128, gateway computer system 120 may proceed to process another task 123 without having to wait for a response from a downstream service 130. Once all tasks 123 have been completed for a requested operation, in various embodiments, gateway computer system returns operation results 129 to client computer system 110.

Orchestrator 121, in various embodiments, orchestrates the performance of a requested operation, which may include delegating tasks 123 constituting the requested operation to task executors 125 for processing. Upon receiving an operation request 115 specifying a particular operation, orchestrator 121 may determine what tasks 123 are to be performed in carrying out the particular operation and the order in which to perform those tasks. As such, in some embodiments, orchestrator 121 consults an operation graph 122 corresponding to the particular operation. Operation graphs 122, in various embodiments, are graphs that each comprise a set of nodes, some or all of which correspond to respective tasks 123. An operation graph 122 may be a directed acyclic graph defined using a graph description language. Accordingly, in various embodiments, orchestrator 121 traverses the appropriate operation graph 122 (according to its defined ordering) and, for each node that identifies a task 123, enqueues that task in one of the available task queues 126. An example orchestrator 121 is discussed in more detail below with respect to FIG. 2A and an example operation graph 122 is discussed in more detail below with respect to FIG. 2B.

Task executors 125, in various embodiments, include a set of task queues 126 and a set of corresponding thread pools 127 having threads executable to process tasks that are enqueued in those task queues 126. In some cases, the definition of a task executor 125 may be defined via an object-oriented programming class definition that logically groups a set of task queues 126 with a set of threads. Accordingly, a task executor 125 may be an instantiation of that class definition. While each task executor 125 depicted in FIG. 1 includes a single task queue 126 and a single thread pool 127, other embodiments might include task executors 125 with larger sets of task queues 126 and thread pools 127. It is further noted that the number of task executors 125 may be varied. For example, the number of task executors 125 may be based on the number of processor cores available to gateway computer system 120.

Threads in a thread pool 127, in various embodiments, are executable to retrieve tasks 123 from their corresponding task queue 126 and process them. In various cases, processing a given task 123 may involve invoking a downstream service 130 to perform a set of actions that is associated with that given task. For example, to process a particular task 123 that involves retrieving a dataset from a particular downstream service 130, a thread may invoke that service to return the dataset. When invoking a given downstream service 130, in various embodiments, a thread performs a non-blocking call 128 that permits the thread to invoke the given service without having to wait for a response from that given service before performing other work. In some cases, a thread may be executable to invoke a downstream service 130 through only non-blocking calls 128—i.e., in some cases, a thread may not perform a blocking call to that downstream service 130. A callback function may be provided as part of a non-blocking call 128 to a downstream service 130 that allows results to be returned to gateway computer system 120. Example task executors 125 are discussed in more detail below with respect to FIG. 3.

Downstream services 130, in various embodiments, are computer systems that provide services accessible to gateway computer system 120. Such services may include, for example, a risk decision service, a compliance decision service, etc. As explained earlier, a downstream service 130 may be invoked by a thread pool 127 of gateway computer system 120 to perform a set of actions as part of carrying out a task 123. In various embodiments, after performing a set of requested actions, a downstream service 130 returns the results from performing the set of actions to gateway computer systems 120. In some cases, the results are stored in a context object associated with an operation and accessible to thread pools 127 for use. Example context objects are discussed in more detail below with respect to FIG. 3 and an example downstream service 130 is discussed in more detail below with respect to FIG. 4.

For illustrative purposes, an example of performing an operation is discussed here. In the example, gateway computer system 120 may receive a request from client computer system 110 to perform a funding planning decision operation. An operation graph 122 corresponding to the funding planning decision operation may indicate that a risk decision service, a limitation decision service, and a compliance decision service (all downstream services) are to be invoked and any results returned by those services are to be consolidated before being returned to client computer system 110. Accordingly, in the example, orchestrator 121 may enqueue a task 123 for invoking the risk decision service and a task 123 for invoking the limitation decision service into task queue 126A. Orchestrator 121 may enqueue a task 123 for invoking the compliance decision service and a consolidation task 123 into task queue 126B.

A thread in thread pool 127A may retrieve the first task 123 (which corresponds to the risk decision service) from task queue 126A and perform that task by invoking the risk decision service via a non-blocking call 128. Instead of waiting for a response from that risk decision service, the thread may retrieve the second task 123 (which corresponds to the limitation decision service) and perform that task by invoking the limitation decision service via another non-blocking call 128. A thread in thread pool 127B may likewise process the two tasks 123 in its task queue 126B. The results obtained from performing the function planning decision operation may then be returned to client computer system 110. An example orchestrator 121 will now be discussed.

Figure 2A:
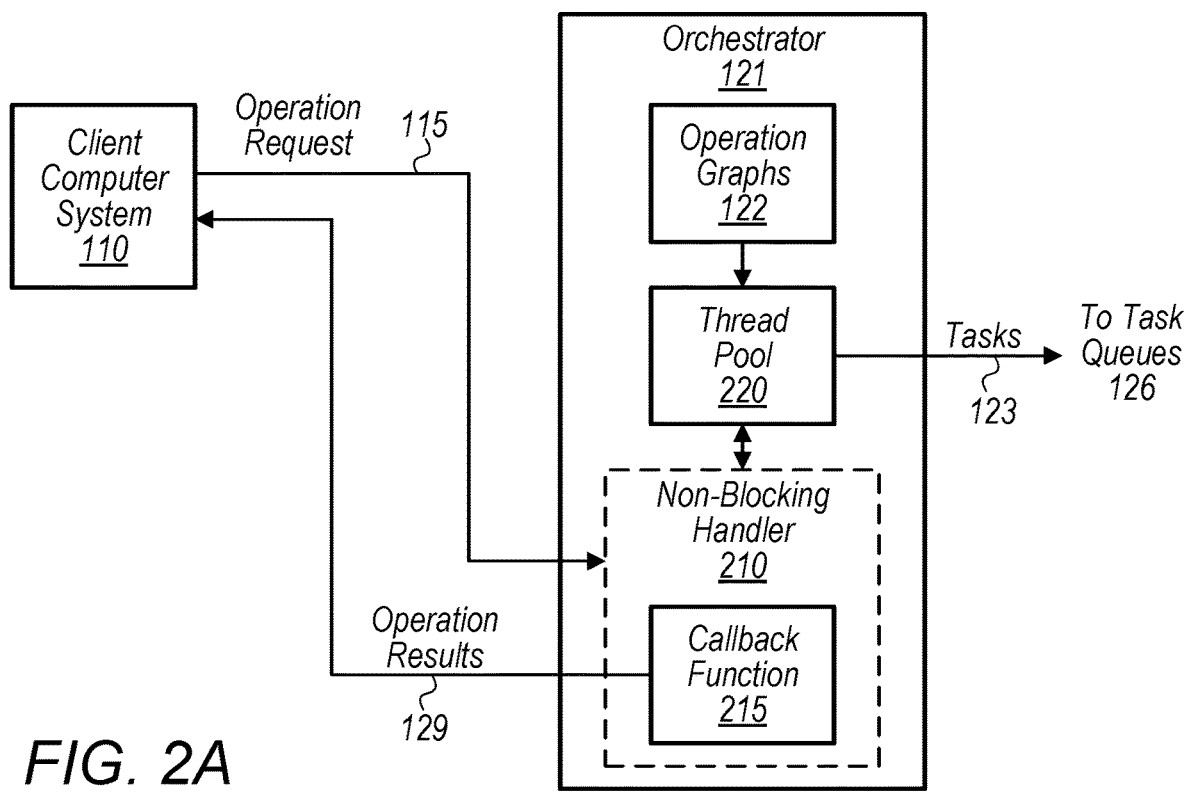
FIG. 2A is a block diagram illustrating example elements of an orchestrator capable of delegating tasks to task queues, according to some embodiments.

Turning now to FIG. 2A, a block diagram of an example orchestrator 121 that delegates tasks 123 to task queues 126 is shown. In the illustrated embodiment, orchestrator 121 includes operation graphs 122, a non-blocking handler 210, and a thread pool 220. As further depicted, non-blocking handler 210 includes a callback function 215. In some embodiments, orchestrator 121 may be implemented differently than shown. For example, non-blocking handler 210 may not be included in orchestrator 121.

As explained earlier, orchestrator 121 may receive an operation request 115 from client computer system 110 to perform an operation. In various embodiments, operation request 115 is received via a non-blocking call that registers a callback function 215 that allows the results of the operation to be returned to client computer system 110.

Non-blocking handler 210, in various embodiments, receives operation request 115 and registers the callback function 215 identified for that request. Thereafter, non-blocking handler 210 may instruct thread pool 220 to perform the requested operation. Once that operation has been completed, non-blocking handler 210 may be notified of its completion and then handler 210 may invoke the registered callback function 215 in order to return operation results 129 of that operation to client computer system 110. In some embodiments, thread pool 220 notifies non-blocking handler 210 of when an operation has completed (and, in some instances, where operation results 129 are stored); in other embodiments, a thread of a thread pool 127 such as the one performing a consolidation task notifies non-blocking handler 210. Invoking callback function 215 may cause non-blocking handler 210 to perform an API call supported by the client computer system 110 to pass in operation results 129 as part of the API call to client computer system 110. It is noted that, in some cases, operation results 129 may be provided to a different computer system than the client computer system 110 that issued operation request 115.

Thread pool 220, in various embodiments, includes a set of threads that is executable to delegate tasks 123 that constitute an operation to task queues 126. Accordingly, the threads in thread pool 220 may retrieve a particular operation graph 122 corresponding to an operation and may traverse that graph, enqueueing tasks 123. Threads in thread pool 220 may each work on a respective operation (e.g., only one thread traverses an operation graph 122) or they may work together on an operation. When working together on an operation, in some embodiments, the threads in thread pool 220 may each traverse down a different path of a graph 122. In some cases, the number of threads in thread pool 220 may be based on the number of operations that need to be processed and/or the complexity of an operation. For example, if an operation graph 122 for a particular operation is complex with multiple paths, then the number of threads may be increased in order to traverse that graph in a quicker manner. As another example, if there are only a few operation requests 115 that need to be handled, then the number of threads in thread pool 220 might be only one.

Threads in thread pool 220 may use different schemes for enqueueing tasks 123 in task queues 126. In some instances, a round-robin scheme may be used in which threads continually rotate through all task queues 126, placing one or more tasks 123 in a given queue 126. In yet other instances, threads in thread pool 220 may assess the available capacity of all task queues 126 and then place tasks 123 in those queues with the most available capacity. In some cases, threads in thread pool 220 may attempt to enqueue tasks 123 in a way that distributes the work of an operation (more or less equally) across task executors 125. Threads may switch between the different schemes as needed.

While not shown, in various embodiments, orchestrator 121 maintains information that identifies which tasks 123 have been enqueued for an operation. Accordingly, thread pool 220 may enqueue a subset of all tasks 123 for an operation and then at a later time, enqueue another subset or all of the remaining tasks 123. The maintained information may, for example, indicate which of the nodes of the appropriate operation graph 122 have been traversed. An example of an operation graph 122 will now be discussed.

Figure 2B:
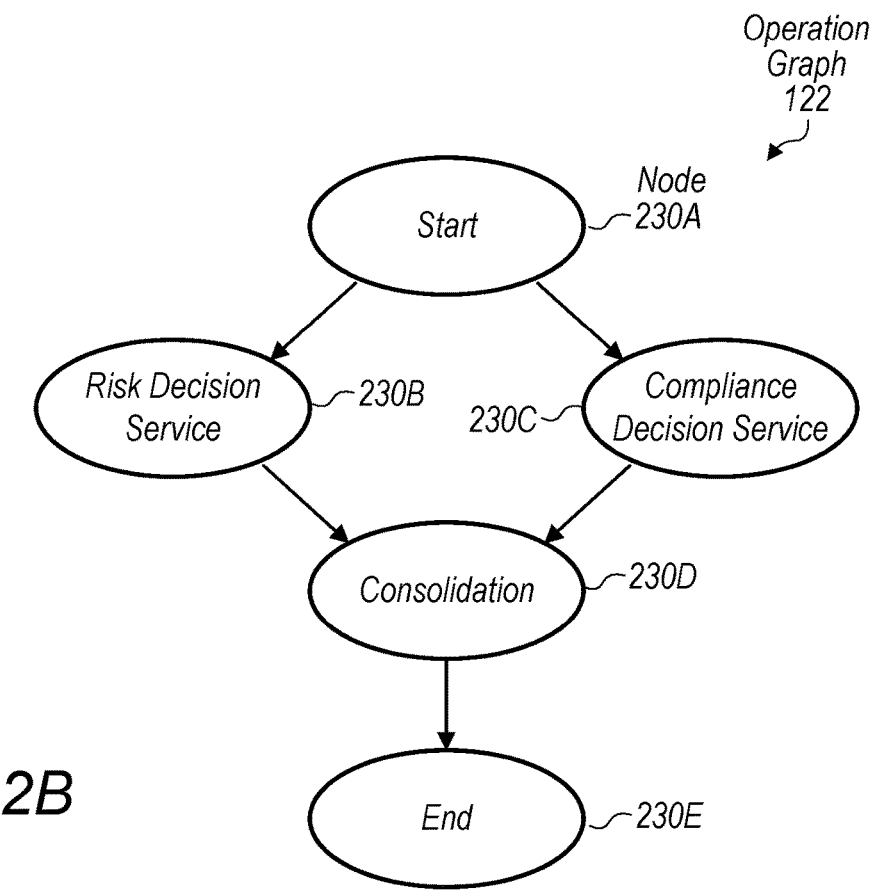
FIG. 2B is a block diagram illustrating example elements of an example operation graph for an example operation, according to some embodiments.

Turning now to FIG. 2B, a block diagram of an example operation graph 122 specified for an example operation is shown. In the illustrated embodiment, operation graph 122 includes various nodes 230, some of which (i.e., nodes 230B-D) correspond to a respective task 123. In some embodiments, an operation graph 122 may be implemented differently than shown. For example, an operation graph 122 may include more or less nodes 230 that form configurations of varying complexity, an operation graph 122 may not include start node 230A and end node 230E, nodes 230 may specify more than one task, etc.

Operation graph 122, in various embodiments, is a directed acyclic graph. The term "a directed acyclic graph" is known in the art and refers to a set of objects (referred to as "nodes") that are connected together, where all the connections (referred to as "edges") define a direction of movement between two respective nodes and there are no graph cycles. A graph cycle refers to a path of nodes and edges that can be taken from a particular node in order to return to that node. (One example of a path in FIG. 2B is the following nodes: 230A→230B→230D→230E. Graph 122 does not include any graph cycles because there are no paths that return to a previous node in the path.) The edge between any two nodes 230 in operation graph 122 may define a flow between those nodes 230 such that traversing operation graph 122 according to that flow may allow for tasks 123 to be performed in a correct order. For example, node 230B (which corresponds to a risk decision service task) is associated with an edge directed to node 230D (which corresponds to a consolidation task). Accordingly, the risk decision service task may be enqueued before the consolidation task so that the risk decision service task is processed first. As further illustrated, multiple nodes 230 have an edge directed to node 230D. In various cases, the task for each of the multiple nodes 230 may be enqueued before the task for node 230D is enqueued. Thus, in various embodiments, orchestrator 121 enqueues tasks 123 in an order specified by the directed nature of operation graph 122.

The example operation graph 122 in FIG. 2B may correspond to an operation in which different properties of a transaction are evaluated. For example, the example operation graph 122 includes a risk decision service task that may involve determining the risk associated with the transaction, and a compliance decision service task that may involve determining whether the transaction complies with certain rules and regulations. Accordingly, when processing the example graph 122, threads in thread pool 220 may begin at the start node 230A and traverse to nodes 230B and 230C. In various cases, the risk decision service task may be enqueued in a first task queue 126 whereas the compliance decision service task may be enqueued in a second task queue 126. Threads in thread pool 220 may then traverse to node 230D and enqueue the consolidation task (which involves consolidating the results of the other two tasks) in the first task queue 126, the second task queue 126, or a third task queue 126. Threads in thread pool 220 may finish processing the example operation graph 122 by traversing to the end node 220E. Examples of task executors 125 will now be discussed.

Figure 3:
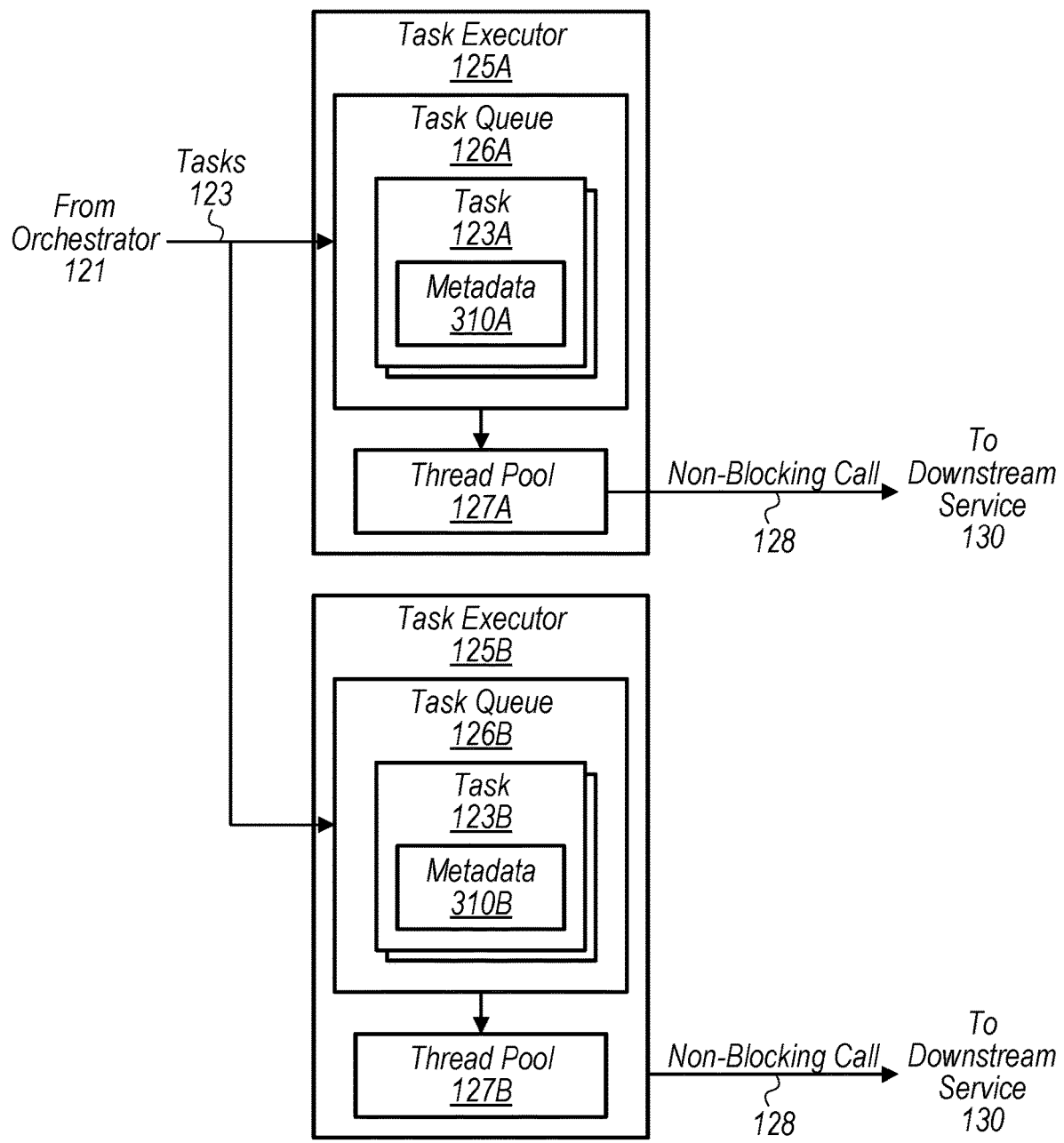
FIG. 3 is a block diagram illustrating example elements of task executors capable of processing enqueued tasks, according to some embodiments.

Turning now to FIG. 3, a block diagram of example task executors 125A and 125B that process tasks 123 is shown. In the illustrated embodiment, task executors 125A and 125B each include a respective task queue 126 and a respective thread pool 127. As further depicted, each task queue 126 includes a particular task 123 having metadata 310. In some embodiments, task executors 125 may be implemented differently than shown. As an example, task executors 125 may include more than one task queue 126.

As explained earlier, an operation may be performed by carrying out one or more tasks 123 that constitute the operation. Those tasks 123 may be delegated by orchestrator 121 to task executors 125, which perform (or assist in performing) them. In order to determine what needs to be done to perform a given task 123, threads in a thread pool 127 may access metadata 310 specified for that given task.

Metadata 310, in various embodiments, defines information that enables task executors 125 to process the corresponding task 123. Metadata 310 may, for example, define the type of a task 123, variables to be used in performing that task, where to store results of that task, the context object associated with that task, etc. For example, metadata 310 may specify that a task 123 involves invoking a downstream service 130. Accordingly, that metadata may specify the ports to be used to call that downstream service and the variables to pass to that service (which may include a callback function for returning results). As another example, metadata 310 may specify that a conversion handler needs to be called for a certain task 123 to convert data from one format to another format.

The results generated from performing tasks 123 along with information pertaining to an operation such as the state of that operation (e.g., what tasks 123 have performed) may be stored or referenced in a data structure that is referred to as "a context object" in the present disclosure. For example, results returned from a downstream service 130 may be referenced by a context object. Thus, in various cases, when performing certain tasks, threads in a thread pool 127 may use metadata 310 of a task 123 to access a context object for that task (which may be referenced via a pointer included in that metadata). For example, a thread carrying out a consolidation task 123 (which may consolidate results from other tasks 123) may access the context object corresponding to that task (and those other tasks 123 as the same context object may be associated with all tasks being performed as part of an operation) in order to access the results (which may be referenced by that context object) for those other tasks.

Task queues 126, in various embodiments, are data structures that are used to store one or more tasks 123 for retrieval by threads in a thread pool 127. In some cases, task queues 126 may be blocking queues. Accordingly, in some of the cases where task queues 126 are blocking queues, when a thread in a thread pool 127 of a task executor 125 attempts to retrieve a task 123 from a corresponding task queue 126 that is empty, that thread may wait until at least one task 123 is enqueued and not perform other work while waiting. That is, in some embodiments, an empty task queue 126 may block a thread, when the thread attempts to retrieve a task 123, from progressing through an execution path until that thread is able to retrieve a task 123 from that task queue. In some cases, a full task queue 126 may block a thread of thread pool 220 of orchestrator 121, when the thread attempts to enqueue a task 123, from progressing though its execution until that thread is able to enqueue that task 123 in that task queue.

Thread pool 127, in various embodiments, includes a set of threads that are executable to retrieve tasks 123 from a task queue 126 and perform them. The number of threads in thread pool 127 may be based on the number of tasks 123 that are enqueued in the corresponding task queue 126. As an example, if the corresponding task queue 126 includes a few tasks 123, then thread pool 127 may include a single thread that processes those tasks. If, however, that queue includes many tasks 123, then thread pool 127 may be adjusted to include multiple threads that each retrieve and process those tasks. The number of threads in thread pool 127, however, may be determined based on other criteria—e.g., the number of available processor cores, available system resources (e.g., memory), etc.

In various instances, when processing certain tasks 123, a thread may need to invoke a particular downstream service 130 identified in metadata 310. Accordingly, when invoking a downstream service 130, a thread may perform a non-blocking call 128 via which that thread instructs that downstream service to perform a set of actions. For example, a thread in thread pool 127A may invoke a downstream service 130 to perform a risk assessment of a transaction between two users. In various embodiments, a thread may instruct a downstream service 130 to perform a set of actions by passing a task 123 to that downstream service via a non-blocking call 128. That task 123 may identify the set of actions to be performed by that downstream service. As part of performing non-blocking call 128, a thread may not wait for a response from the invoked downstream service 130, but instead, may retrieve another task 123 from its corresponding task queue 126 for processing. In some embodiments, a thread provides a callback function that, when executed by that invoked downstream service 130, enables that service to result results. Those results may then be stored in the appropriate context object and potentially consolidated at a later point in time. A thread may also provide other information such as variables to use when performing the set of actions to a downstream service 130 as part of non-blocking call 128. An example of a downstream service 130 will now be discussed.

Figure 4:
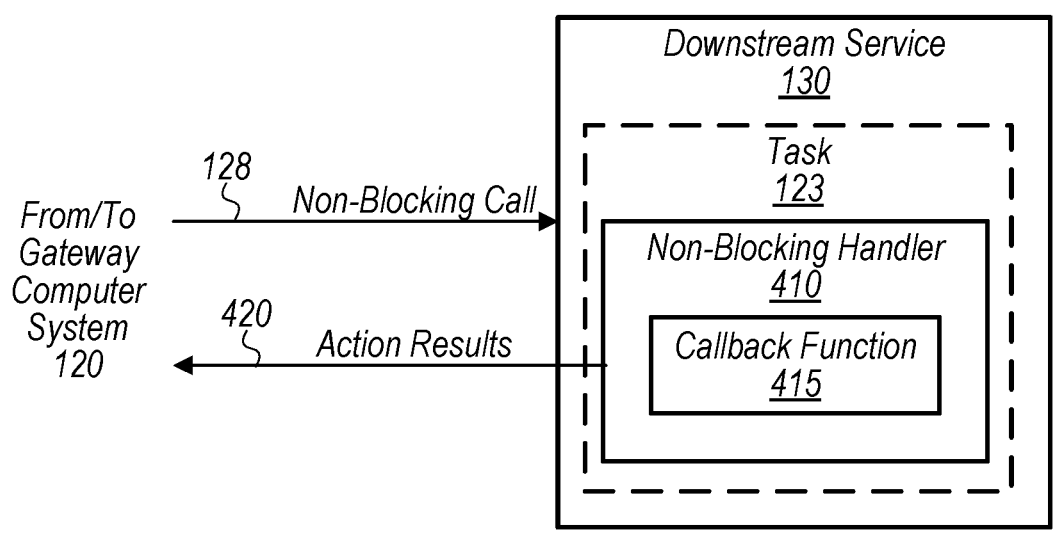
FIG. 4 is a block diagram illustrating example elements of a downstream service capable of processing requests from a gateway computer system, according to some embodiments.

Turning now to FIG. 4, a block diagram of an example downstream service 130 callable by gateway computer system 120 is shown. In the illustrated embodiment, downstream service 130 includes a task 123 having a non-blocking handler 410. As further shown, non-blocking handler 410 includes a callback function 415. In some embodiments, downstream service 130 may be implemented differently than shown—e.g., non-blocking handler 410 may be separate from a task 123 and/or may not include callback function 415.

As explained earlier, a downstream service 130 may be invoked via a non-blocking call 128 to perform a set of actions. As part of non-blocking call 128, in various embodiments, a callback function 415 is passed from gateway computer system 120 to that downstream service 130. In various embodiments, callback function 415 is passed a part of a task 123 included in a non-blocking call 128. Non-blocking handler 410, in various embodiments, registers that callback function 415 so that it may be invoked to return action results 420. Accordingly, downstream service 130 may perform the set of requested actions (which may be defined by a task 123 included in a non-blocking call 128) and then invoke callback function 415 to return actions results 420 that resulted from performing the set of actions.

Callback function 415, in various embodiments, is a set of software routines that allows for downstream service 130 to return action results 420. In some instances, callback function 415 may cause downstream service 130 to perform an API call supported by gateway computer system 120 to store actions results 420 in the context object associated with the particular task 123 that involved invoking that downstream service 130 in the first place. In other instances, callback function 415 may cause downstream service 130 to perform an API call that enqueues a certain task 123 (in one of the task queues 126) that includes or references actions results 420 so that a thread in a thread pool 127 may store those actions results in the appropriate context object or another location specified by that task.

Figure 5:
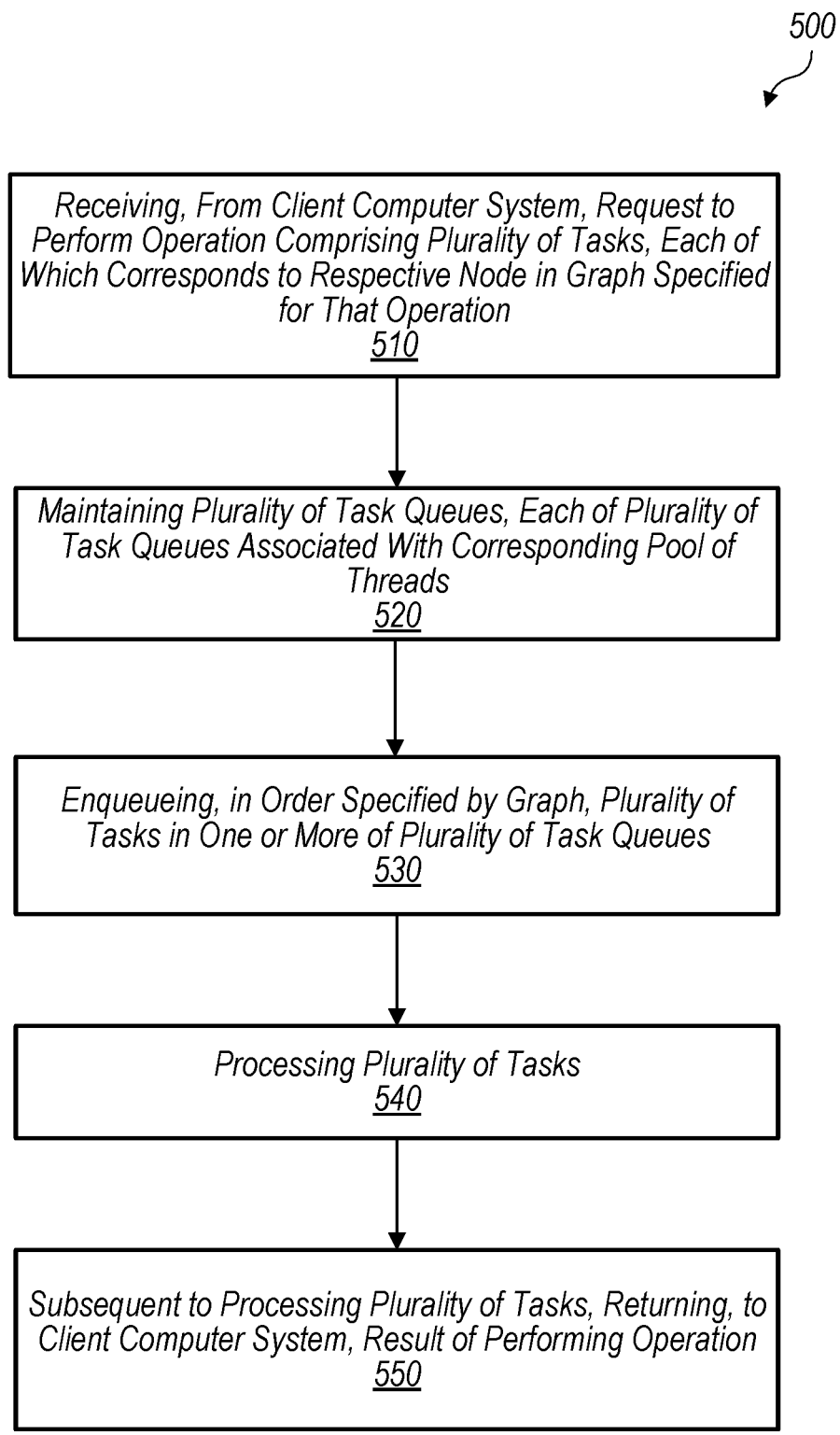
FIGS. 5-7 are flow diagrams illustrating example methods that relate to performing an operation comprising a set of tasks, according to some embodiments.

Turning now to FIG. 5, a flow diagram of a method 500 is shown. Method 500 is one embodiment of a method performed by a computer system such as gateway computer system 120 to perform an operation comprising a set of tasks (e.g., tasks 123). In some embodiments, method 500 may include additional steps. For example, the computer system may increase the number of threads in a thread pool (e.g., thread pool 127) corresponding to a task queue (e.g., task queue 126).

Method 500 begins in step 510 with the computer system receiving, from a client computer system (e.g., client computer system 110), a request (e.g., operation request 115) to perform an operation comprising a plurality of tasks, each of which corresponds to a respective node (e.g., a node 230) in a graph (e.g., an operation graph 122) specified for that operation. The operation may include performing a risk evaluation for a particular transaction. In various instances, at least one of the plurality of tasks may specify a call to a downstream service (e.g., downstream service 130A). In some instances, at least two of the plurality of tasks each specify a call to a respective, separate downstream service that is capable of performing a respective portion of the risk evaluation. In various embodiments, the request from the client computer system identifies a callback function (e.g., callback function 215) that is to be invoked after performing the operation In step 520, the computer system maintains a plurality of task queues (e.g., task queues 126). Each of the plurality of task queues may be associated with a corresponding pool of threads (e.g., a thread pool 127). In some embodiments, the number of tasks queues maintained by the computer system is based on the number of processor cores available to the computer system.

In step 530, the computer system enqueues, in an order that is specified by the graph, the plurality of tasks in one or more of the plurality of task queues. In various embodiments, an orchestrator (e.g., orchestrator 121) of the computer system may traverse the graph and, for each node corresponding to a task of the plurality of tasks, enqueue that task in one of the plurality of task queues. The orchestrator may include a particular pool of threads (e.g., thread pool 220) executable to process the graph, and each thread in the particular pool may be executable to traverse a set of different paths of the graph than any other thread in the particular pool. The plurality of tasks, in some embodiments, are associated with a context object that is capable of storing information (e.g., results returned by a downstream service) pertaining to the operation.

In step 540, the computer system processes the plurality of tasks. The processing may include a thread of a particular queue in which the particular task is enqueued performing a non-blocking call (e.g., a non-blocking call 128) to the downstream service. In various cases, performing the non-blocking call may include: the thread sending a request to the downstream service to perform an action that is identified by the particular task; and without waiting for a response from the downstream service, the thread retrieving another task from the particular queue. The request to the downstream service may identify a callback function (e.g., callback function 415) to be invoked by the downstream service to return, to the computer system, a result (e.g., action results 42) of performing the action. In some cases, the result of performing the action that is returned by the downstream service may be stored in the context object.

In step 550, subsequent to processing the plurality of tasks, the computer system returns, to the client computer system, a result (e.g., operation results 129) of performing the operation. In some instances, one of the plurality of tasks may specify a consolidation action to be performed to consolidate results stored in the context object that are from processing the other ones of the plurality of tasks. Accordingly, the consolidated results may correspond to the result returned for the operation. Returning the result of performing the operation may include the computer system invoking the callback function received in the request from the client computer system.

Figure 6:
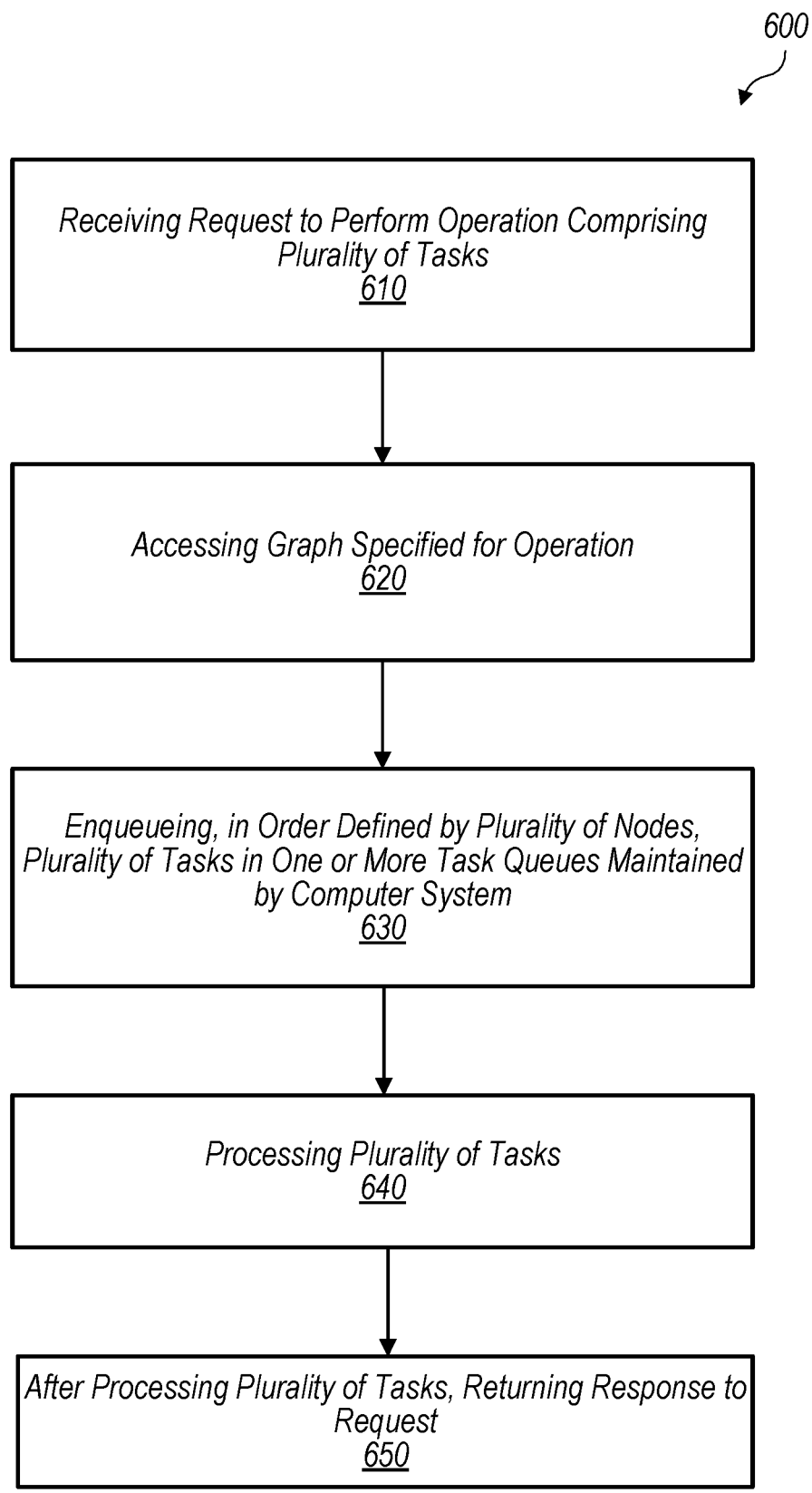

Turning now to FIG. 6, a flow diagram of a method 600 is shown. Method 600 is one embodiment of a method performed by a computer system such as gateway computer system 120 to perform an operation comprising a set of tasks (e.g., tasks 123). Method 600 may be performed by executing a set of program instructions stored on a non-transitory computer-readable medium. In some embodiments, method 600 may include additional steps such as the computer system instantiating, based on a graph definition, a data structure that stores data identifying nodes of a graph.

Method 600 begins in step 610 with the computer system receiving a request (e.g., operation request 115) to perform an operation comprising a plurality of tasks. A particular one of the plurality of tasks may identify an action to be performed by a downstream service (e.g., downstream service 130Z). In some embodiments, the computer system further registers a callback function (e.g., callback function 215) that is identified by the request.

In step 620, the computer system accesses a graph (e.g., an operation graph 122) that is specified for the operation. The graph may include a plurality of nodes (e.g., nodes 230) defining an order in which to perform the operation. In some instances, each of the plurality of tasks may correspond to a respective node of the plurality of nodes;

In step 630, the computer system enqueues, in the order defined by graph, the plurality of tasks in one or more task queues maintained by the computer system. In some embodiments, the computer system instantiate one or more threads to traverse the graph and, for each node corresponding to a task, enqueue that task in one of the one or more task queues. The one or more threads may be further, when enqueueing a task in a task queue, wait for that task queue to have an available entry for storing that task before proceeding to enqueue another task. In some embodiments, each of the one or more task queues may be associated with a set of threads (e.g., a thread pool 127) instantiated by the computer system for processing tasks that are enqueued in that task queue.

In step 640, the computer system processes the plurality of tasks. The processing may include instantiating a thread to retrieve the particular task from a task queue associated with the thread and to perform a non-blocking call (e.g., non-blocking call 128) to the downstream service associated with the particular task. Performing the non-blocking call may include sending a request to the downstream service to perform the action identified by the particular task; and retrieving another task from the particular queue without waiting for a response from the downstream service.

In step 650, after processing the plurality of tasks, the computer system returns a response to the initial request. The response may include a result (e.g., operation results 129) of the operation. Returning the response to the request may include invoking the callback function received in the request.

Figure 7:
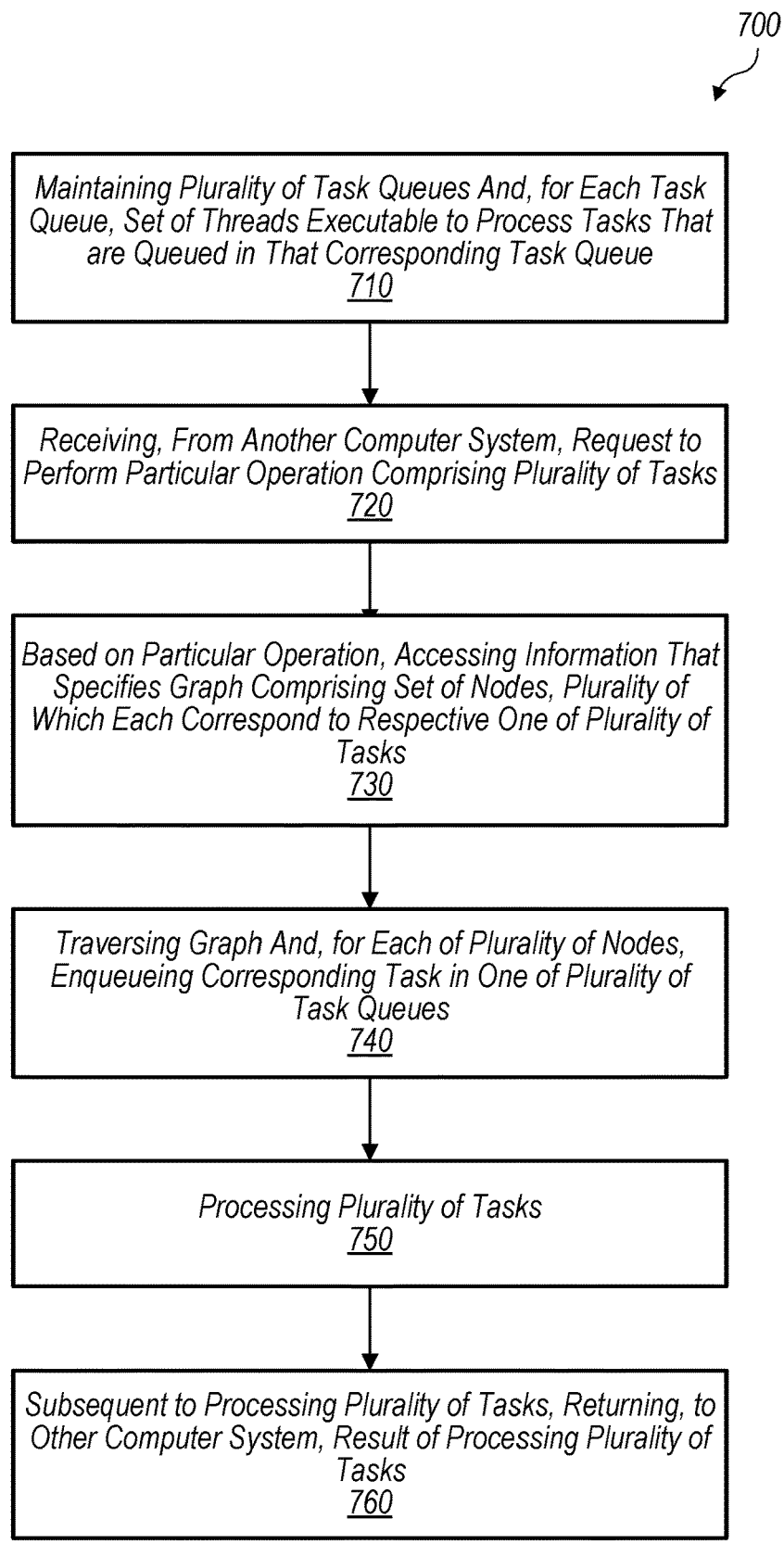

Turning now to FIG. 7, a flow diagram of a method 700 is shown. Method 700 is one embodiment of a method performed by a computer system such as gateway computer system 120 to perform an operation comprising a set of tasks (e.g., tasks 123). In some embodiments, method 700 may include additional steps. For example, the computer system may register a callback function (e.g., callback function 215) received from another computer system (e.g., client computer system 110).

Method 700 begins in step 710 with the computer system maintaining a plurality of task queues (e.g., task queues 126) and, for each task queue, a set of threads (e.g., a thread pool 127) executable to process tasks that are queued in that corresponding task queue.

In step 720, the computer system receives, from another computer system, a request (e.g., operation request 115) to perform a particular operation comprising a plurality of tasks. A particular one of the plurality of tasks may involve requesting that a downstream service (e.g., a downstream service 130) perform a particular action. In some cases, the request from the other computer system may identify a callback function invokable to return a result from performing the particular operation to the other computer system In step 730, the based on the particular operation, the computer system accesses information that specifies a graph comprising a set of nodes, a plurality of which each correspond to a respective one of the plurality of tasks.

In step 740, the computer system traverses the graph and, for each of the plurality of nodes, enqueues the corresponding task in one of the plurality of task queues. In some cases, each of the plurality of tasks may be enqueued in a different one of the plurality of task queues.

In step 750, the computer system processes the plurality of tasks. Such processing may include a particular thread associated with the particular task performing a non-blocking call (e.g., a non-blocking call 128) to the downstream service to request that the downstream service perform the particular action. Performing the non-blocking call may include requesting that the downstream service preform the particular action; and the particular thread retrieving another task from the task queue corresponding to the particular thread without waiting for a response from the downstream service before retrieving the other task. In some instances, the particular thread is executable to perform, when invoking a downstream service, only non-blocking calls to invoke that downstream service.

In step 760, the subsequent to processing the plurality of tasks, the computer system returns, to the other computer system, a result (e.g., operation results 129) from processing the plurality of tasks. Returning the result may include the computer system invoking the callback function received from the other computer system.

Exemplary Computer System

Figure 8:
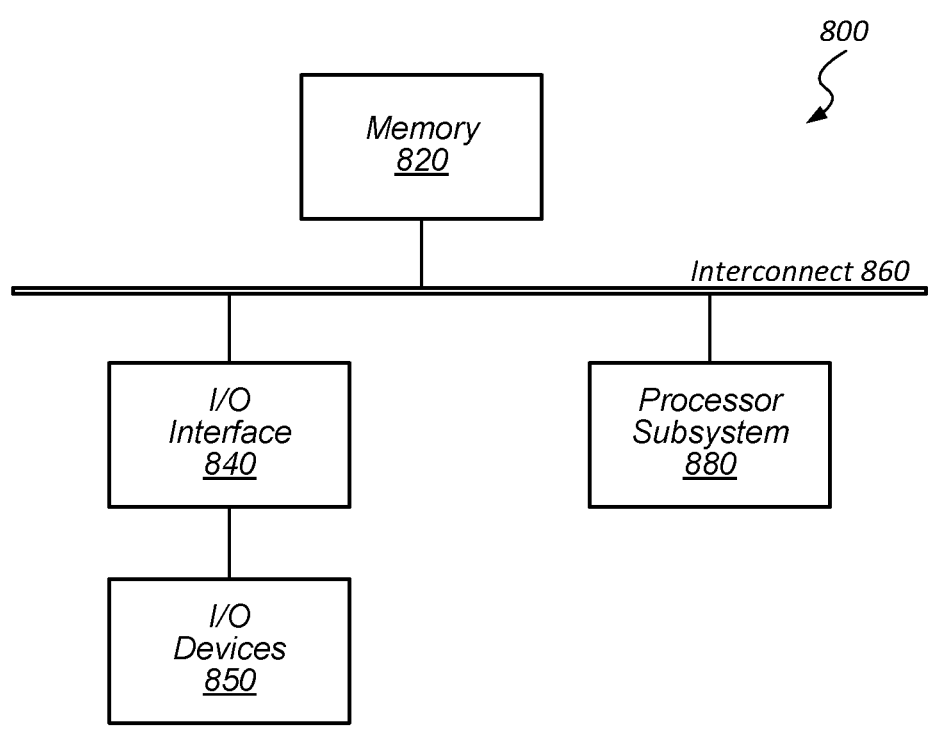
FIG. 8 is a block diagram illustrating an example computer system, according to some embodiments.

Turning now to FIG. 8, a block diagram of an exemplary computer system 800, which may implement client computer system 110, gateway computer system 120, and/or a downstream service 130 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement orchestrator 121 and/or task executors 125 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a gateway computer system from a client computer system, a request to perform an operation comprising a plurality of tasks, each of which corresponds to a respective node in a graph specified for that operation, wherein at least a particular task of the plurality of tasks specifies a call to a downstream service;
maintaining, by the gateway computer system, a plurality of task queues, wherein each of the plurality of task queues are associated with a corresponding pool of threads;
traversing, by the gateway computer system, the graph using a plurality of threads to enqueue metadata for each of the plurality of tasks in one or more of the plurality of task queues, wherein the metadata for a given task of the plurality of tasks specifies:
a type of the given task to be performed; and
a pointer to a context object shared among the plurality of tasks that is usable for storing results of the operation;
performing, by the gateway computer system, the plurality of tasks, wherein the performing includes:
a thread of a particular queue in which metadata of the particular task is enqueued performing a non-blocking call to the downstream service; and
a thread performing a consolidation task included in the plurality of tasks to consolidate results stored in the context object into a consolidated result, wherein the results stored in the context object are from performing the other tasks of the plurality of tasks; and
subsequent to performing the plurality of tasks, returning, to the client computer system by the gateway computer system, the consolidated result of performing the operation.

2. The method of claim 1, wherein performing the non-blocking call includes:
sending, by the thread of the particular queue, a request to the downstream service to perform an action that is identified by the metadata of the particular task; and
without waiting for a response from the downstream service, retrieving, by the thread of the particular queue, metadata of another task from the particular queue.

3. The method of claim 2, wherein the request to the downstream service identifies a callback function to be invoked by the downstream service to return, to the gateway computer system, a result of performing the action.

4. The method of claim 1, wherein the request from the client computer system identifies a callback function to be invoked after performing the operation, wherein returning the consolidated result of performing the operation includes the gateway computer system invoking the callback function.

5. The method of claim 1, wherein the operation includes performing a risk evaluation for a particular transaction, and wherein at least two of the plurality of tasks each specify a call to a respective, separate downstream service that is capable of performing a respective portion of the risk evaluation.

6. The method of claim 1, wherein the traversing includes, for each node corresponding to a task of the plurality of tasks, enqueuing metadata for that task in one of the plurality of task queues.

7. The method of claim 1, wherein a number of tasks queues maintained by the gateway computer system is based on a number of processor cores of the gateway computer system.

8. A non-transitory computer readable medium having program instructions stored thereon that are executable to cause a computer system to perform operations comprising:
receiving a request to perform an operation comprising a plurality of tasks, wherein a particular task of the plurality of tasks identifies an action to be performed by a downstream service;
accessing a graph specified for the operation, wherein the graph includes a plurality of nodes defining an order in which to perform the operation, and wherein each of the plurality of tasks corresponds to a respective node of the plurality of nodes;
enqueueing, in the order defined by the graph, metadata for each of the plurality of tasks in one or more task queues maintained by the computer system, wherein the metadata for a given task of the plurality of tasks specifies:
a type of the given task to be performed; and
a pointer to a context object shared among the plurality of tasks that is usable for storing results of the operation;
performing the plurality of tasks, wherein the performing includes:
instantiating a thread to retrieve metadata of the particular task from a task queue associated with the thread and to perform a non-blocking call to the downstream service associated with the particular task; and
instantiating a thread to perform a consolidation task included in the plurality of tasks to consolidate results stored in the context object into a consolidated result, wherein the results stored in the context object are from performing the other tasks of the plurality of tasks
after performing the plurality of tasks, returning a response to the request, wherein the response includes the consolidated result of the operation.

9. The medium of claim 8, wherein the thread is instantiated to perform the non-blocking call by:
sending a request to the downstream service to perform the action identified by the metadata of the particular task; and
retrieving metadata of another task from the task queue without waiting for a response from the downstream service.

10. The medium of claim 8, wherein the operations further comprise:
registering, by the computer system, a callback function that is identified by the request, wherein returning the response to the request includes invoking the callback function.

11. A system, comprising:
at least one processor; and
memory having program instructions stored thereon that are executable by the at least one processor to perform operations comprising:
maintaining a plurality of task queues, wherein a given task queue of the plurality of task queues is associated with a set of threads executable to process metadata of tasks queued in the given task queue;

receiving, from another system, a request to perform an operation comprising a plurality of tasks, wherein a particular task of the plurality of tasks includes requesting that a downstream service perform a particular action;

based on the operation, accessing information that specifies a graph comprising nodes that each correspond to a respective task of the plurality of tasks;

traversing the graph to enqueue metadata for each of the plurality of tasks in one or more of the plurality of task queues, wherein the metadata for a given task of the plurality of tasks specifies:

a type of the given task to be performed; and a pointer to a context object shared among the plurality of tasks that is usable for storing results of the operation;

performing the plurality of tasks, wherein the performing includes instantiating a particular thread associated with the particular task to perform a non-blocking call to the downstream service to request that the downstream service perform the particular action; and subsequent to performing the plurality of tasks, returning, to the other system, a consolidated result derived from results stored in the context object.

12. The system of claim 11, wherein performing the non-blocking call includes:

requesting, by the particular thread, that the downstream service perform the particular action; and retrieving, by the particular thread, metadata of another task from a task queue corresponding to the particular thread without waiting for a response from the downstream service before retrieving the metadata of the other task.

13. The system of claim 11, wherein the request from the other system identifies a callback function invokable to return the consolidated result to the other system, and wherein returning the consolidated result includes invoking the callback function.

14. The system of claim 11, wherein the metadata for each of the plurality of tasks is enqueued in a different one of the plurality of task queues.

15. The system of claim 11, wherein all calls to one or more downstream services that are associated with the operation are non-blocking calls.

* * * * *